United States Patent
Lakshman et al.

(10) Patent No.: US 10,795,577 B2
(45) Date of Patent: Oct. 6, 2020

(54) DE-DUPLICATION OF CLIENT-SIDE DATA CACHE FOR VIRTUAL DISKS

(71) Applicant: Commvault Systems, Inc., Tinton Falls, NJ (US)

(72) Inventors: Avinash Lakshman, Fremont, CA (US); Gaurav Yadav, Mountain View, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 15/156,015

(22) Filed: May 16, 2016

(65) Prior Publication Data
US 2017/0329530 A1    Nov. 16, 2017

(51) Int. Cl.
G06F 3/06    (2006.01)
G06F 9/455    (2018.01)

(52) U.S. Cl.
CPC ............ *G06F 3/0608* (2013.01); *G06F 3/067* (2013.01); *G06F 3/0641* (2013.01); *G06F 3/0665* (2013.01); *G06F 3/0689* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 5,499,367 A | 3/1996 | Bamford et al. |
| 5,559,991 A | 9/1996 | Kanfi |
| 5,625,793 A | 4/1997 | Mirza |
| 5,642,496 A | 6/1997 | Kanfi |
| 5,732,240 A | 3/1998 | Caccavale |
| 5,765,173 A | 6/1998 | Cane et al. |
| 6,286,084 B1 | 9/2001 | Wexler et al. |
| 6,418,478 B1 | 7/2002 | Ignatius et al. |
| 6,425,057 B1 | 7/2002 | Cherkasova et al. |
| 6,542,972 B2 | 4/2003 | Ignatius et al. |

(Continued)

FOREIGN PATENT DOCUMENTS

| | | |
|---|---|---|
| WO | WO 2006/052872 | 5/2006 |
| WO | WO 2010/013292 A1 | 2/2010 |

(Continued)

OTHER PUBLICATIONS

U.S. Appl. No. 16/352,606, filed Mar. 13, 2019.

(Continued)

*Primary Examiner* — Larry T Mackall
(74) *Attorney, Agent, or Firm* — Commvault Systems, Inc.

(57) ABSTRACT

A computer receives a write request including an offset within a virtual disk. The computer writes the data block to a remote platform and calculates a hash value of the data. If the hash value does not exist in a first table of a block cache of the computer, the computer adds a pair to the first table: hash value/block cache data offset. Next, the computer adds a pair in a second table of the block cache: virtual disk offset of the data/hash value. A read request uses these tables to find the data in the cache without accessing the platform. The read consults the second table to find the hash value corresponding to the virtual disk offset of the block. The hash value is a key into the first table to find the block cache data offset of the data; the data is read from the cache.

23 Claims, 7 Drawing Sheets

(56) References Cited

U.S. PATENT DOCUMENTS

| | | |
|---|---|---|
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 6,760,812 B1 | 7/2004 | Degenaro et al. |
| 6,823,377 B1 | 11/2004 | Wu et al. |
| 7,003,641 B2 | 2/2006 | Prahlad et al. |
| 7,028,096 B1 | 4/2006 | Lee |
| 7,035,880 B1 | 4/2006 | Crescenti et al. |
| 7,103,617 B2 | 9/2006 | Phatak |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,284,030 B2 | 10/2007 | Ackaouy et al. |
| 7,315,923 B2 | 1/2008 | Retnamma et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,472,238 B1 | 12/2008 | Gokhale et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,539,710 B1 | 5/2009 | Haustein et al. |
| 7,543,125 B2 | 6/2009 | Gokhale |
| 7,546,324 B2 | 6/2009 | Prahlad et al. |
| 7,574,692 B2 | 8/2009 | Herscu |
| 7,584,338 B1 | 9/2009 | Bricker et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Prahlad et al. |
| 7,720,841 B2 | 5/2010 | Gu et al. |
| 7,734,820 B1 | 6/2010 | Ranade et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 7,814,149 B1 | 10/2010 | Stringham |
| 7,822,939 B1 | 10/2010 | Veprinsky et al. |
| 8,145,614 B1 | 3/2012 | Zimran et al. |
| 8,204,862 B1 | 6/2012 | Paulzagade et al. |
| 8,209,334 B1 | 6/2012 | Doerner |
| 8,364,652 B2 | 1/2013 | Vijayan Retnamma et al. |
| 8,370,542 B2 | 2/2013 | Lu et al. |
| 8,484,162 B2 | 7/2013 | Prahlad et al. |
| 8,549,350 B1 | 10/2013 | Dutch et al. |
| 8,572,340 B2 | 10/2013 | Vijayan Retnamma et al. |
| 8,577,851 B2 | 11/2013 | Vijayan Retnamma et al. |
| 8,578,109 B2 | 11/2013 | Vijayan Retnamma et al. |
| 8,732,133 B2 | 5/2014 | Attarde |
| 8,930,306 B1 | 1/2015 | Ngo et al. |
| 8,938,481 B2 | 1/2015 | Kumarasamy et al. |
| 8,954,446 B2 | 2/2015 | Vijayan Retnamma et al. |
| 9,020,900 B2 | 4/2015 | Vijayan Retnamma et al. |
| 9,021,198 B1 | 4/2015 | Vijayan |
| 9,104,623 B2 | 8/2015 | Vijayan Retnamma et al. |
| 9,116,850 B2 | 8/2015 | Vijayan Retnamma et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,251,186 B2 | 2/2016 | Muller et al. |
| 9,275,086 B2 | 3/2016 | Kumarasamy |
| 9,298,715 B2 | 3/2016 | Kumarasamy et al. |
| 9,298,723 B1* | 3/2016 | Vincent ............... G06F 16/1748 |
| 9,342,253 B1* | 5/2016 | Muthukkaruppan ........................ G06F 3/0641 |
| 9,342,537 B2 | 5/2016 | Kumarasamy et al. |
| 9,405,482 B2 | 8/2016 | Varadharajan |
| 9,411,534 B2 | 8/2016 | Lakshman |
| 9,424,058 B1 | 8/2016 | Wasson et al. |
| 9,424,151 B2 | 8/2016 | Lakshman |
| 9,483,205 B2 | 11/2016 | Lakshman |
| 9,558,085 B2 | 1/2017 | Lakshman |
| 9,575,673 B2 | 2/2017 | Mitkar et al. |
| 9,633,033 B2 | 4/2017 | Vijayan et al. |
| 9,633,056 B2 | 4/2017 | Attarde et al. |
| 9,639,274 B2 | 5/2017 | Maranna |
| 9,665,591 B2 | 5/2017 | Vijayan et al. |
| 9,753,955 B2 | 9/2017 | Agrawal |
| 9,798,489 B2 | 10/2017 | Lakshman |
| 9,848,046 B2 | 12/2017 | Mehta |
| 9,864,530 B2 | 1/2018 | Lakshman |
| 9,875,063 B2 | 1/2018 | Lakshman |
| 10,061,663 B2 | 8/2018 | Vijayan et al. |
| 10,067,722 B2 | 9/2018 | Lakshman |
| 10,223,211 B2 | 3/2019 | Kumarasamy |
| 10,223,212 B2 | 3/2019 | Kumarasamy |
| 10,255,143 B2 | 4/2019 | Vijayan et al. |
| 10,310,953 B2 | 6/2019 | Vijayan et al. |
| 10,339,106 B2 | 7/2019 | Vijayan et al. |
| 10,380,072 B2 | 8/2019 | Attarde et al. |
| 2001/0052015 A1 | 12/2001 | Lin et al. |
| 2002/0062439 A1 | 5/2002 | Cotugno et al. |
| 2002/0143892 A1 | 10/2002 | Mogul |
| 2003/0115346 A1 | 6/2003 | McHenry et al. |
| 2003/0174648 A1 | 9/2003 | Wang et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0098373 A1 | 5/2004 | Bayliss et al. |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0117558 A1 | 6/2005 | Angermann et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0273654 A1 | 12/2005 | Chen et al. |
| 2006/0020660 A1 | 1/2006 | Prasad et al. |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0098041 A1 | 4/2008 | Chidambaran et al. |
| 2008/0244172 A1 | 10/2008 | Kano |
| 2008/0244204 A1 | 10/2008 | Cremelie et al. |
| 2008/0250204 A1 | 10/2008 | Kavuri et al. |
| 2008/0281908 A1 | 11/2008 | McCanne et al. |
| 2008/0320151 A1 | 12/2008 | McCanne et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0183162 A1 | 7/2009 | Kindel et al. |
| 2009/0204649 A1 | 8/2009 | Wong et al. |
| 2009/0217265 A1* | 8/2009 | Ishikawa ............. G06F 9/45504 718/1 |
| 2009/0268903 A1 | 10/2009 | Bojinov et al. |
| 2009/0276454 A1 | 11/2009 | Smith |
| 2009/0327625 A1 | 12/2009 | Jaquette et al. |
| 2010/0070478 A1 | 3/2010 | Anglin |
| 2010/0082558 A1 | 4/2010 | Anglin et al. |
| 2010/0088296 A1 | 4/2010 | Periyagaram et al. |
| 2010/0250549 A1 | 9/2010 | Muller et al. |
| 2010/0250896 A1 | 9/2010 | Matze |
| 2010/0257142 A1 | 10/2010 | Murphy et al. |
| 2010/0257346 A1 | 10/2010 | Sosnosky et al. |

(56) References Cited

U.S. PATENT DOCUMENTS

| | | |
|---|---|---|
| 2010/0312752 A1 | 12/2010 | Zeis et al. |
| 2010/0318759 A1 | 12/2010 | Hamilton et al. |
| 2011/0099154 A1* | 4/2011 | Maydew ............ G06F 16/1748 707/692 |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0161723 A1 | 6/2011 | Taleck et al. |
| 2011/0191834 A1* | 8/2011 | Singh ............ G06F 17/00 726/6 |
| 2011/0258161 A1 | 10/2011 | Constantinescu et al. |
| 2011/0265083 A1* | 10/2011 | Davis ............ G06F 12/0866 718/1 |
| 2011/0302140 A1 | 12/2011 | Gokhale et al. |
| 2012/0016839 A1 | 1/2012 | Yueh |
| 2012/0089574 A1 | 4/2012 | Doerner |
| 2012/0150818 A1 | 6/2012 | Vijayan Retnamma et al. |
| 2012/0233417 A1 | 9/2012 | Kalach |
| 2013/0227552 A1* | 8/2013 | Reddin ............ G06F 9/45558 718/1 |
| 2013/0339298 A1 | 12/2013 | Muller et al. |
| 2013/0339310 A1 | 12/2013 | Muller et al. |
| 2013/0339407 A1* | 12/2013 | Sharpe ............ G06F 17/30194 707/827 |
| 2013/0346709 A1* | 12/2013 | Wang ............ G06F 11/1456 711/162 |
| 2014/0181438 A1 | 6/2014 | Varadharajan |
| 2014/0181441 A1 | 6/2014 | Kottomtharayil |
| 2014/0181443 A1 | 6/2014 | Kottomtharayil |
| 2014/0201150 A1 | 7/2014 | Kumarasamy et al. |
| 2014/0201485 A1 | 7/2014 | Ahn |
| 2014/0324793 A1* | 10/2014 | Glazemakers ........ G06F 3/0641 707/692 |
| 2015/0127658 A1 | 5/2015 | Ding et al. |
| 2015/0212893 A1 | 7/2015 | Pawar et al. |
| 2015/0212894 A1 | 7/2015 | Pawar et al. |
| 2015/0212895 A1 | 7/2015 | Pawar et al. |
| 2015/0212896 A1 | 7/2015 | Pawar et al. |
| 2015/0212897 A1 | 7/2015 | Pawar et al. |
| 2015/0370495 A1* | 12/2015 | Georgiev ............ G06F 3/0641 711/114 |
| 2016/0004611 A1* | 1/2016 | Lakshman .......... G06F 11/2089 714/6.23 |
| 2016/0019224 A1 | 1/2016 | Ahn |
| 2016/0062846 A1 | 3/2016 | Nallathambi et al. |
| 2016/0065671 A1 | 3/2016 | Nallathambi et al. |
| 2016/0139836 A1 | 5/2016 | Nallathambi et al. |
| 2016/0142483 A1 | 5/2016 | Nallathambi et al. |
| 2016/0350302 A1 | 12/2016 | Lakshman |
| 2016/0350391 A1 | 12/2016 | Vijayan Retnamma et al. |
| 2016/0371104 A1 | 12/2016 | Zamir |
| 2017/0192861 A1 | 7/2017 | Vijayan et al. |
| 2017/0192868 A1 | 7/2017 | Vijayan et al. |
| 2017/0193003 A1 | 7/2017 | Vijayan et al. |
| 2017/0329527 A1 | 11/2017 | Lakshman |

FOREIGN PATENT DOCUMENTS

| | | |
|---|---|---|
| WO | WO 2012/044366 | 4/2012 |
| WO | WO 2012/044367 | 4/2012 |
| WO | WO 2013/188550 | 12/2013 |

OTHER PUBLICATIONS

U.S. Appl. No. 16/569,385, filed Sep. 12, 2019.
Bhagwat, Extreme Binning: Scalable, Parallel Deduplication for Chunk-based File Backup. IEEE 2009, 9 pages.
Dubnicki, et al. "HYDRAstor: A Scalable Secondary Storage." FAST. vol. 9.2009, 74 pages.
Cohen, Edith, et al., "The Age Penalty and Its Effect on Cache Performance." In USITS, pp. 73-84. 2001.
Cohen, Edith, et al., "Aging through cascaded caches: Performance issues in the distribution of web content." In ACM SIGCOMM Computer Communication Review, vol. 31, No. 4, pp. 41-53. ACM, 2001.
Cohen, Edith, et al., "Refreshment policies for web content caches." Computer Networks 38.6 (2002): 795-808.
Wei, et al. "MAD2: A scalable high-throughput exact deduplication approach for network backup services." Mass Storage Systems and Technologies (MSST), 2010 IEEE 26th Symposium on. IEEE, 2010, 14 pages.
CommVault Systems, Inc. "Continuous Data Replicator 7.0," Product Data Sheet, 2007.
CommVault Systems, Inc., "Deduplication—How To," http://documentation.commvault.com/commvault/release_8_0_0/books_online_1/english_US/features/single_instance/single_instance_how_to.htm, internet accessed on Jan. 26, 2009, 7 pages.
CommVault Systems, Inc., "Deduplication," http://documentation.commvault.com/commvault/release_8_0_0/books_online_1/english_US/features/single_instance/single_instance.htm, Internet accessed on Jan. 26, 2009, 9 pages.
International Search Report and Written Opinion, International Application No. PCT/US2009/58137, dated Dec. 23, 2009, 14 pages.
International Search Report and Written Opinion, International Application No. PCT/US2011/030804, dated Jun. 9, 2011.
International Search Report and Written Opinion, International Application No. PCT/US2011/030814, dated Jun. 9, 2011.
International Search Report and Written Opinion, International Application No. PCT/US2013/045443 dated Nov. 14, 2013, 16 pages.
International Preliminary Report on Patentability, International Application No. PCT/US2013/045443 dated Dec. 16, 2014 11 pages.
Wolman et al., On the scale and performance of cooperative Web proxy caching, 1999.
Wu, et al., Load Balancing and Hot Spot Relief for Hash Routing among a Collection of Proxy Caches, 1999.
Office Action dated Jul. 3, 2017 for U.S. Appl. No. 15/155,838.
Final Office Action dated Feb. 8, 2018 for U.S. Appl. No. 15/155,838.
Office Action dated Nov. 19, 2018 for U.S. Appl. No. 15/155,838.
Lakshman et al. U.S. Appl. No. 15/155,838, filed May 16, 2016.
Final Office Action dated Aug. 7, 2019 for U.S. Appl. No. 15/155,838.
Office Action dated Mar. 19, 2020 for U.S. Appl. No. 15/155,838.
Notice of Allowance dated Jul. 11, 2020 for U.S. Appl. No. 15/155,838.

* cited by examiner

Block Cache

| MD5 | Block Cache Data Offset |
|---|---|
| 7066c43.... | |
| a38cd1a.... | |
| ⋮ | |

| Virtual Disk Offset | MD5 |
|---|---|
| "Avinash" 0K | 3cb069.... |
| "Avinash" 4K | f1eb76.... |
| ⋮ | ⋮ |

DE-DUPLICATION OF CLIENT-SIDE DATA CACHE FOR VIRTUAL DISKS

CROSS-REFERENCE TO RELATED APPLICATIONS

This application is related to U.S. patent application Ser. Nos. 14/322,813, 14/322,832, 14/684,086, 14/322,850, 14/322,855, 14/322,867, 14/322,868, 14/322,871, and 14/723,380, which are all hereby incorporated by reference. This application is related to U.S. patent application Ser. No. 15/155,838, filed on the same date, which is also hereby incorporated by reference.

FIELD OF THE INVENTION

The present invention relates generally to local caching of data to be stored on a virtual disk within a data center. More specifically, the present invention relates to de-duplication of data stored in the local cache.

BACKGROUND OF THE INVENTION

In the field of data storage, enterprises have used a variety of techniques in order to store the data that their software applications use. At one point in time, each individual computer server within an enterprise running a particular software application (such as a database or e-mail application) would store data from that application in any number of attached local disks. Although this technique was relatively straightforward, it led to storage manageability problems in that the data was stored in many different places throughout the enterprise.

These problems led to the introduction of the storage area network in which each computer server within an enterprise communicated with a central storage computer node that included all of the storage disks. The application data that used to be stored locally at each computer server was now stored centrally on the central storage node via a fiber channel switch, for example. Although such a storage area network was easier to manage, changes in computer server architecture created new problems.

With the advent of virtualization, each computer server can now host dozens of software applications through the use of a hypervisor on each computer server and the use of virtual machines. Thus, computer servers which had been underutilized could now host many different server applications, each application needing to store its data within the storage area network. Weaknesses in the storage area network were revealed by the sheer number of server applications needing to access disks within the central storage node. And, even with the use of remote storage platforms (such as "in-the-cloud" storage), problems still exist.

For example, the sheer amount of data that applications desire to store in a remote storage platform can overwhelm a local virtual machine if it attempts to cache data to be stored remotely in the storage platform, can raise costs, and can lead to inefficiency. Attempts to remove duplicates of locally-cached data have been tried but are not optimal. Accordingly, further techniques and systems are desired to remove duplicates of data cached at a local computer.

SUMMARY OF THE INVENTION

To achieve the foregoing, and in accordance with the purpose of the present invention, techniques are disclosed that provide the advantages discussed below.

Use of a global client-side cache within a computer server of a compute farm allows any client application, software application or virtual machine executing on that computer to make use of this client-side cache. De-duplication of blocks of data within this client-side cache then occurs globally and automatically for all applications executing upon that computer or upon others, regardless of which is the client and regardless of which virtual disk is being accessed within the storage platform. Additionally, each application may decide whether or not to enable client-side caching for each of its virtual disks.

In addition, the storage resources overhead associated with de-duplication metadata is minimal (<2%) compared to other prior art techniques, and the present invention keeps metadata distributed as well, which means node or disk failures do not lead to a reduction in de-duplication ratios. And, the computing resources overhead is negligible as well: the present invention does not need any specific hardware for de-duplication, and can be run on any commodity hardware. Moreover, the present invention performs global de-duplication, not at the volume or disk level, which means higher de-duplication ratios across the entire storage platform. Finally, the present invention performs in-line de-duplication, which means the invention only writes unique data to the storage platform. Prior art offline or asynchronous de-duplication performs de-duplication in the background, and hence does not provide any real-time guarantees as to reduction in storage. Thus, in-line de-duplication also increases the capacity and life of raw disks.

In a first embodiment, a method writes a block of data to a virtual disk on a remote storage platform. First, a computer server receives a write request to write the block of data from the computer server to the remote storage platform, the write request includes an offset within the virtual disk and the data. The server writes the block of data to a storage node of the storage platform. After this write, or even prior, the computer server calculates a hash value of the block of data using a hash function or similar function to produce a unique identifier for the block. The computer determines whether the resulting hash value exists in a first metadata table of a block cache of the computer server. If so, the computer adds an entry in a second metadata table of the block cache that includes the virtual disk offset and the hash value as a key/value pair. A later read request uses these tables to find the block of data in the cache without the need to go to the storage platform.

In a second embodiment, a method writes a block of data to a virtual disk on a remote storage platform. First, a computer server receives a write request to write the block of data from the computer server to the remote storage platform, the write request includes an offset within the virtual disk and the data. The server writes the block of data to a storage node of the storage platform. After this write, or even prior, the computer server calculates a hash value of the block of data using a hash function or similar function to produce a unique identifier for the block. The computer determines whether the resulting hash value exists in a first metadata table of a block cache of the computer server. If not, the computer writes the block of data into the block cache at a block cache data offset and stores the hash value and the block cache data offset as a key/value pair in the first metadata table. Next the computer adds an entry in a second metadata table of the block cache that includes the virtual disk offset and the hash value as a key/value pair. A later read request uses these tables to find the block of data in the cache without the need to go to the storage platform.

In a third embodiment, a method reads a block of data from a virtual disk on a remote storage platform. First a computer server receives a read request to read the block of data from the remote storage platform, the read request includes an offset within the virtual disk. Next, the computer server determines whether the virtual disk offset exists as an entry in a first metadata table of a block cache of the computer server. If so, the computer retrieves a unique identifier corresponding to the virtual disk offset in the entry, and then accesses a second metadata table of the block cache and retrieves a block cache data offset using the unique identifier as a key. Finally, the computer reading the block of data from the block cache at the block cache data offset. Thus, it is not necessary to access a remote storage platform to read the block of data.

In a fourth embodiment, a method reads a block of data from a virtual disk on a remote storage platform. First a computer server receives a read request to read the block of data from the remote storage platform, the read request includes an offset within the virtual disk. Next, the computer server determines whether the virtual disk offset exists as an entry in a first metadata table of a block cache of the computer server. If not, the computer reads the block of data from a remote storage platform. The block is then returned to the requesting application.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Storage System

Figure 1:
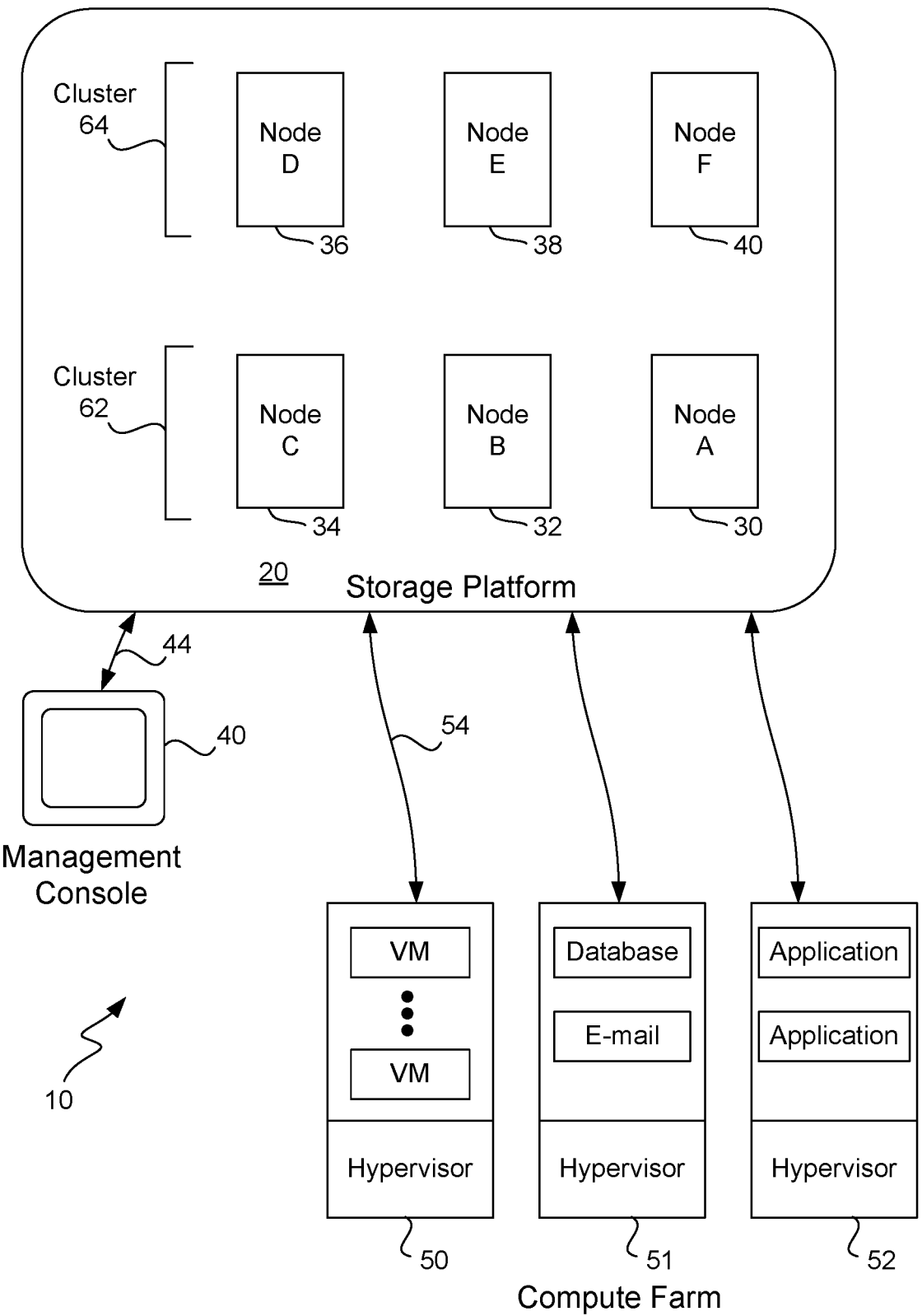
FIG. 1 illustrates a data storage system having a storage platform according to one embodiment of the invention.

FIG. 1 illustrates a data storage system 10 according to one embodiment of the invention having a storage platform 20. Included within the storage platform 20 are any number of computer nodes 30-40. Each computer node of the storage platform has a unique identifier (e.g., "A") that uniquely identifies that computer node within the storage platform. Each computer node is a computer having any number of hard drives and solid-state drives (e.g., flash drives), and in one embodiment includes about twenty disks of about 1 TB each. A typical storage platform may include on the order of about 81 TB and may include any number of computer nodes. One advantage is that a platform may start with as few as three nodes and then grow incrementally to as large as 1,000 nodes or more.

Computers nodes 30-40 are shown logically being grouped together, although they may be spread across data centers and may be in different geographic locations. A management console 40 used for provisioning virtual disks within the storage platform communicates with the platform over a link 44. Any number of remotely located computer servers 50-52 each typically executes a hypervisor in order to host any number of virtual machines. Server computers 50-52 form what is typically referred to as a compute farm.

Management console 40 is any suitable computer able to communicate over an Internet connection or link 44 with storage platform 20. When an administrator wishes to manage the storage platform (e.g., provisioning a virtual disk, snapshots, revert, clone, analyze metrics, determine health of cluster, etc.) he or she uses the management console to access the storage platform and is put in communication with a management console routine executing as part of a software module on any one of the computer nodes within the platform. The management console routine is typically a Web server application.

In order to provision a new virtual disk within storage platform 20 for a particular application running on a virtual machine, the virtual disk is first created and then attached to a particular virtual machine. In order to create a virtual disk, a user uses the management console to first select the size of the virtual disk (e.g., 100 GB), and then selects the individual policies that will apply to that virtual disk. For example, the user selects a replication factor, a data center aware policy and other policies concerning whether or not to compress the data, the type of disk storage, etc. Once the virtual disk has been created, it is then attached to a particular virtual machine within one of the computer servers 50-52 and the provisioning process is complete.

Advantageously, storage platform 20 is able to simulate prior art central storage nodes (such as the VMax and Clarion products from EMC, VMWare products, etc.) and the virtual machines and software applications will be unaware that they are communicating with storage platform 20 instead of a prior art central storage node. In addition, the provisioning process can be completed on the order of minutes or less, rather than in four to eight weeks as was typical with prior art techniques. The advantage is that one only needs to add metadata concerning a new virtual disk in order to provision the disk and have the disk ready to perform writes and reads.

Provision Virtual Disk

Typically, an administrator is aware that a particular software application desires a virtual disk within the platform and is aware of the characteristics that the virtual disk should have. The administrator first uses the management console to access the platform and connect with the management console Web server on any one of the computer nodes within the platform. The administrator chooses the characteristics of the new virtual disk such as a name; a size; a replication factor; a residence; compressed; a replication policy; cache enabled (a quality-of-service choice); and a disk type (indicating whether the virtual disk is of a block type—the iSCSI protocol—or of a file type—the NFS protocol).

As mentioned above, one of the characteristics for the virtual disk that may be chosen is whether or not the client-side cache of the local computer should be enabled for that virtual disk. Applications that do not read or write frequently may not desire the cache to be enabled (as writing to the cache can add overhead), while applications that read and write frequently may desire the cache to be enabled. Cache enablement, thus, is an optional feature that may be turned on or off for each virtual disk.

Once chosen, these characteristics are stored as "virtual disk information" metadata onto a computer node within the storage platform and may be replicated. In this fashion, the virtual disk metadata has been stored upon metadata nodes within the platform (which might be different from the nodes where the actual data of the virtual disk will be stored). In addition, the identities of the storage nodes which store this metadata for the virtual disk is also sent to the controller virtual machine for placing into a cache.

The virtual disk that has been created is also attached to a virtual machine of the compute farm. In this step, the administrator is aware of which virtual machine on which computer of the compute farm needs the virtual disk. Thus, information regarding the newly created virtual disk (i.e., name, space available, virtual disk information, etc.) is sent from the management console routine to the appropriate computer within the compute farm. The information is provided to a controller virtual machine which stores the information in a cache, ready for use when the virtual machine needs to write or to read data. The administrator also supplies the name of the virtual disk to the application that will use it.

Figure 2:
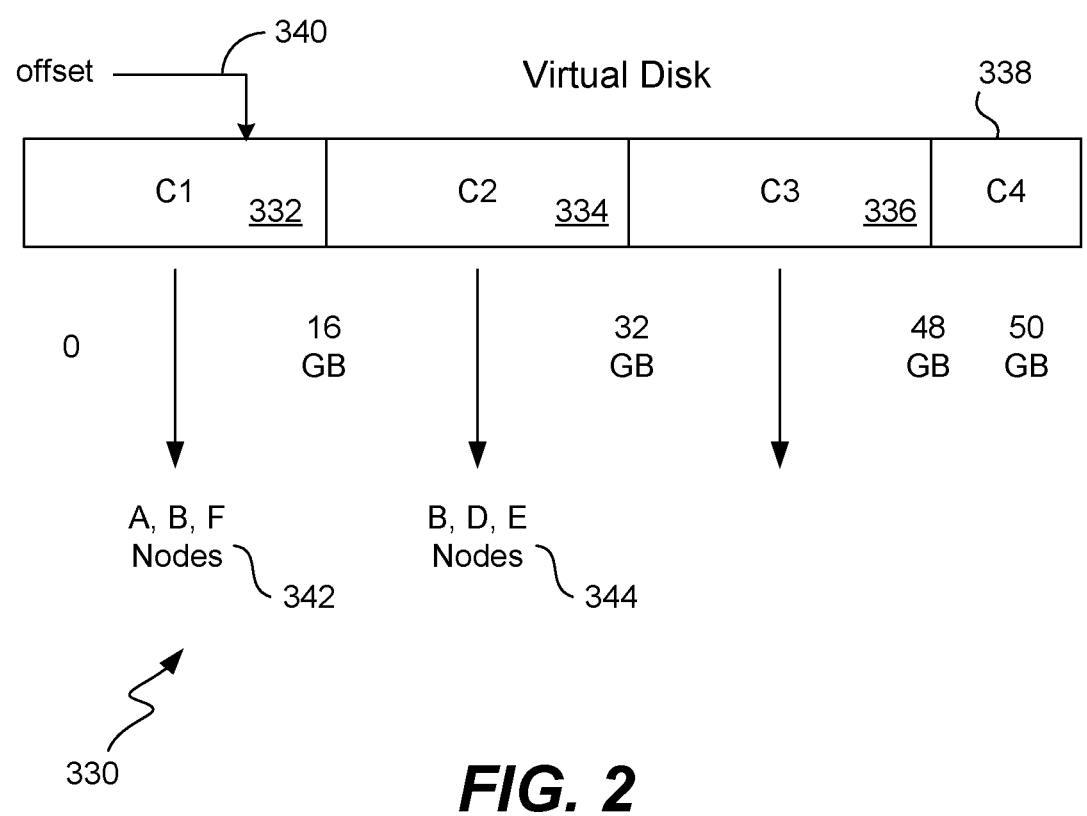
FIG. 2 is a symbolic representation of a virtual disk showing how data within the virtual disk is stored within the storage platform.

FIG. 2 is a symbolic representation of a virtual disk 330 showing how data within the virtual disk is stored within the storage platform. As shown, the virtual disk has been provisioned as a disk holding up to 50 GB, and the disk has been logically divided into segments or portions of 16 GB each. Each of these portions is termed a "container," and may range in size from about 4 GB up to about 32 GB, although a size of 16 GB works well. As shown, portions 332-338 are referred to as containers C1, C2, C3 and C4.

Similar to a traditional hard disk, as data is written to the virtual disk at a particular offset 340 (ranging from 0 up to the size of the virtual disk) the virtual disk will fill up symbolically from left to right. Each container of data will be stored upon a particular node or nodes within the storage platform that are chosen during the write process. In the example of FIG. 2, the replication factor is three, thus, data stored within container 332 will be stored upon the three nodes A, B and F, data stored within the second container 334 will be stored upon the three nodes B, D and E, etc. Note that this storage technique using containers is one of many possible implementations of the storage platform and is transparent to the virtual machines that are storing data.

Controller Virtual Machine

Figure 3:
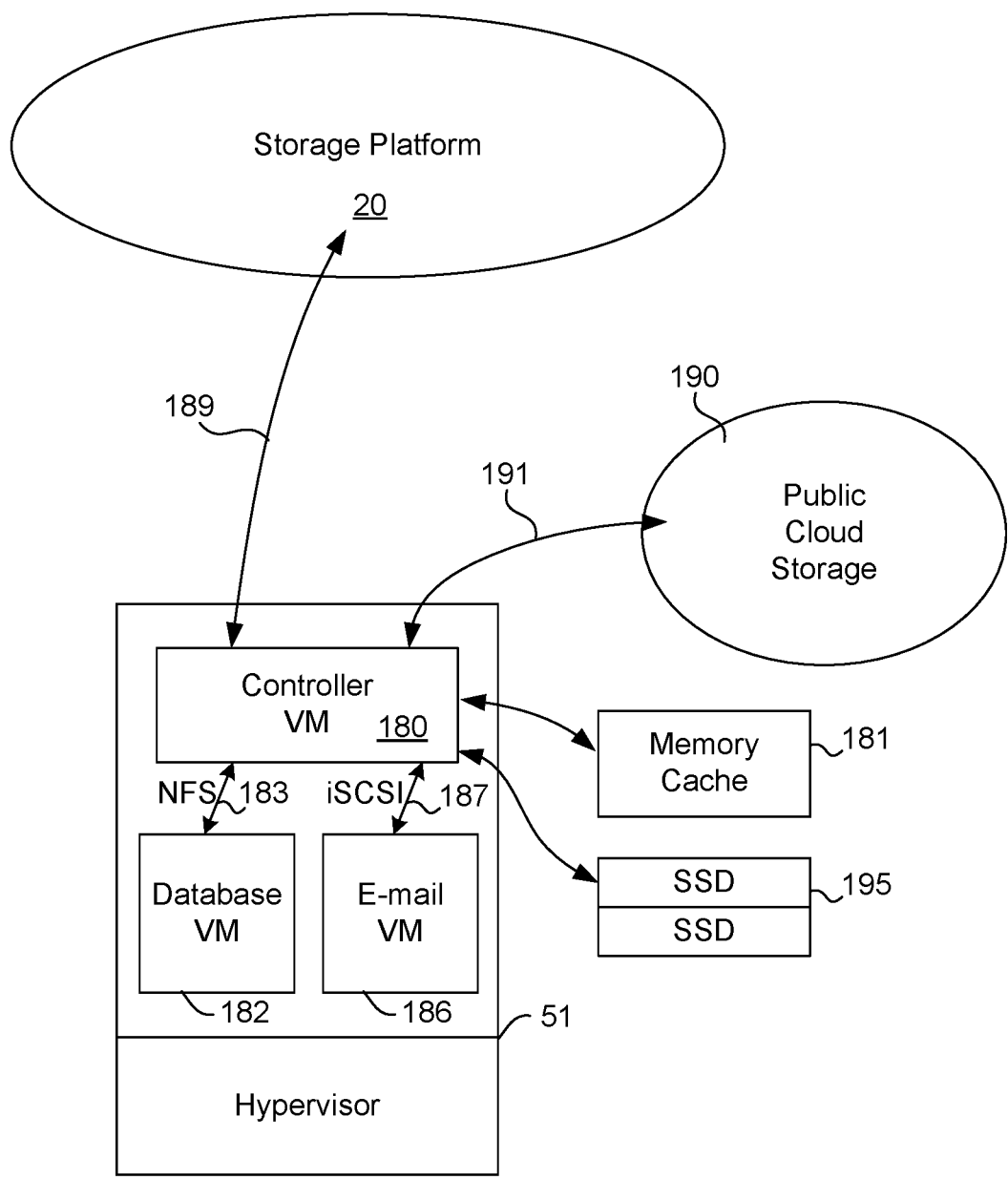
FIG. 3 illustrates in greater detail the computer servers in communication with the storage platform.

FIG. 3 illustrates in greater detail one of the computer servers 51 in communication with storage platform 20. As mentioned above, each computer server may host any number of virtual machines, each executing a particular software application. The application may perform I/O handling using a block-based protocol such as iSCSI, using a file-based protocol such as NFS, and the virtual machine communicates using this protocol. Of course, other suitable protocols may also be used by an application. The actual communication protocol used between the server and platform is transparent to these virtual machines.

As shown, server 51 includes a hypervisor and virtual machines 182 and 186 that desire to perform I/O handling using the iSCSI protocol 187 or the NFS protocol 183. Server 51 also includes a specialized controller virtual machine (CVM) 180 that is adapted to handle communications with the virtual machines using either protocol (and others), yet communicates with the storage platform using a proprietary protocol 189. Protocol 189 may be any suitable protocol for passing data between storage platform 20 and a remote computer server 51 such as TCP. In addition, the CVM may also communicate with public cloud storage using the same or different protocol 191. Advantageously, the CVM need not communicate any "liveness" information between itself and the computer nodes of the platform. There is no need for any CVM to track the status of nodes in the cluster. The CVM need only talk to a node in the platform, which is then able to route requests to other nodes and public storage nodes.

The CVM also uses a memory cache 181 on the computer server 51. In communication with computer server 51 and with CVM 180 are also any number of solid-state disks (or other similar persistent storage) 195 that will be explained in greater detail below. These disks may be used as a data cache to store data blocks that are written into storage platform 20 and then to rapidly retrieve these data blocks instead of retrieving them from the remote storage platform.

CVM 180 handles different protocols by simulating an entity that the protocol would expect. For example, when communicating under the iSCSI block protocol, CVM responds to an iSCSI Initiation by behaving as an iSCSI Target. In other words, when virtual machine 186 performs I/O handling, it is the iSCSI Initiator and the controller virtual machine is the iSCSI Target. When an application is using the block protocol, the CVM masquerades as the iSCSI Target, traps the iSCSI CDBs, translates this information into its own protocol, and then communicates this information to the storage platform. Thus, when the CVM presents itself as an iSCSI Target, the application may simply talk to a block device as it would do normally.

Similarly, when communicating with an NFS client, the CVM behaves as an NFS server. When virtual machine 182 performs I/O handling the controller virtual machine is the NFS server and the NFS client (on behalf of virtual machine 182) executes either in the hypervisor of computer server 51 or in the operating system kernel of virtual machine 182. Thus, when an application is using the NFS protocol, the CVM masquerades as an NFS server, captures NFS packets, and then communicates this information to the storage platform using its own protocol.

An application is unaware that the CVM is trapping and intercepting its calls under the iSCSI or NFS protocol, or that the CVM even exists. One advantage is that an application need not be changed in order to write to and read from the storage platform. Use of the CVM allows an application executing upon a virtual machine to continue using the protocol it expects, yet allows these applications on the various computer servers to write data to and read data from the same storage platform 20.

Replicas of a virtual disk may be stored within public cloud storage 190. As known in the art, public cloud storage refers to those data centers operated by enterprises that allow the public to store data for a fee. Included within these data centers are those known as Amazon Web Services and Google Compute. During a write request, the write request will include an identifier for each computer node to which a replica should be written. For example, nodes may be identified by their IP address. Thus, the computer node within the platform that first fields the write request from the CVM will then route the data to be written to nodes identified by their IP addresses. Any replica that should be sent to the public cloud can then simply be sent to the DNS name of a particular node which request (and data) is then routed to the appropriate public storage cloud. Any suitable computer router within the storage platform may handle this operation.

Client-Side Cache

As mentioned above, a client machine, such as computer 51, uses a data cache 195 in order to store blocks of data that it has written to storage platform 20 in order to retrieve those blocks more quickly when a read is performed. The present invention provides an apparatus and technique in order to efficiently cache data on the client side so that during a read operation from a software application it may not be necessary to access the remote storage platform 20. One advantage of the present invention is that very large sizes of a data cache are supported and that blocks of data are stored efficiently. The invention facilitates very large data caches because the invention de-duplicates data in the cache as well, which in turn increases the cache capacity by the factor of the de-duplication ratio.

Figures 4, 5, 6:
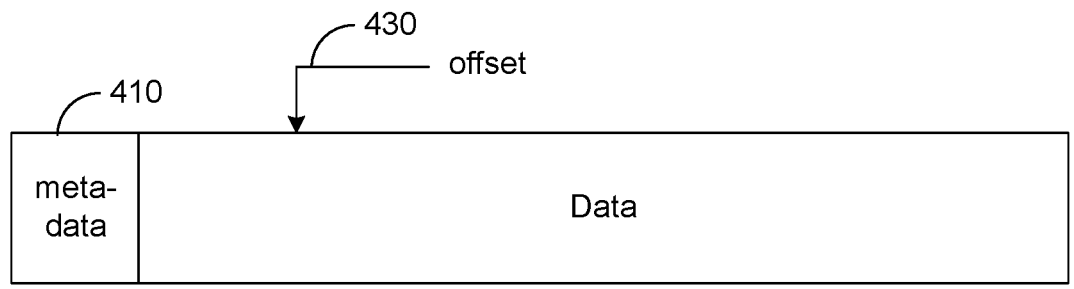
FIG. 4 illustrates one example of a block cache.
FIG. 5 illustrates a metadata table present within metadata used to store identifiers for blocks of data that have been stored within the block cache.
FIG. 6 illustrates another metadata table present within metadata used to store MD5s corresponding to a virtual disk offsets.

FIG. 4 illustrates one example of a block cache 195. Preferably, the block cache is implemented using persistent storage such as any number of hard disks, and most preferably solid-state disks are used. There may be one or more solid-state disks in the block cache. Given a particular size of the block cache (such as 1 TB), FIG. 4 indicates that approximately 10% of the block cache is used for metadata storage 410 and that the remaining portion 420 is used for data storage. A block cache data offset 430 is used to indicate a particular location of a particular block of data within the block cache. The block cache can be many disks or one disk. Preferably, the invention takes only one disk as an input. But, users may combine multiple disks into one disk using suitable software such as a Logical Volume Manager (LVM) tool.

FIG. 5 illustrates a metadata table 440 present within metadata 410 used to store identifiers for blocks of data that have been stored within the block cache. Metadata is stored in pairs, where column 444 indicates the MD5 (or other message digest or unique hash value from a hash function) of a particular block of data, and where column 448 indicates the offset within data 420 where that block of data has been stored.

FIG. 6 illustrates a metadata table 480 present within metadata 410 used to store MD5s corresponding to a virtual disk offsets. This metadata is stored in pairs, where column 484 indicates a particular offset of a block of data within a particular named virtual disk, and where column 488 indicates the MD5 for the corresponding block of data.

Write Using Client-Side Cache

Figure 7:
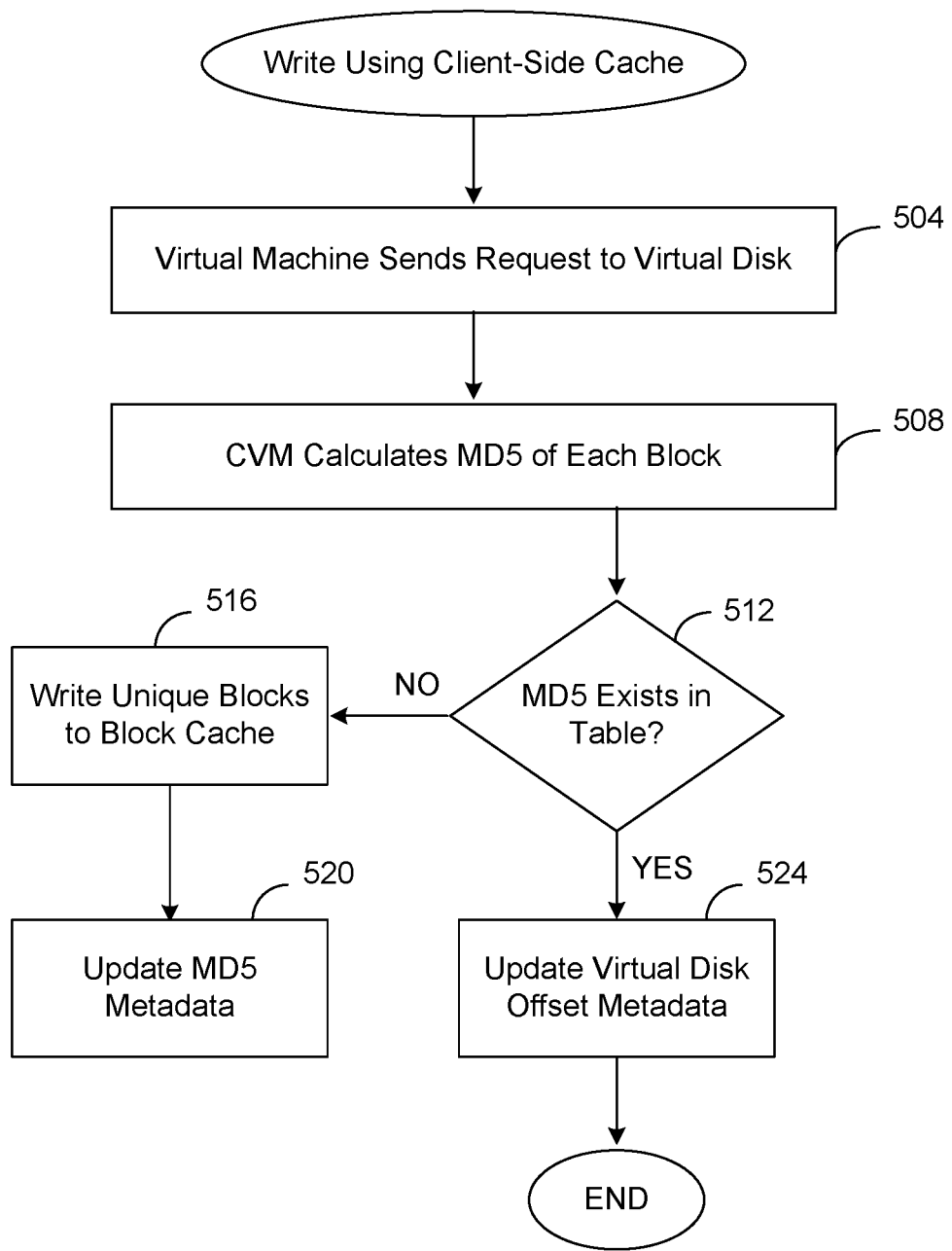
FIG. 7 is a flow diagram describing one embodiment by which a virtual machine writes data to the storage platform.

FIG. 7 is a flow diagram describing one embodiment by which a virtual machine writes data to the storage platform. In this embodiment, an application on a virtual machine is writing to a virtual disk within the platform that has the client-side cache 195 enabled. The CVM is aware of which virtual disks have the cache enabled and which have not because it has stored the virtual disk information into its memory cache 181. This flow may be performed in conjunction with actually sending the data to the storage platform, before sending such data, or after sending such data.

In step 504 the virtual machine (on behalf of its software application) that desires to write data into the storage platform sends a write request including the data to be written to a particular virtual disk. The request may originate from a virtual machine on the same computer as the CVM, or from a virtual machine on a different computer. As mentioned, a write request may originate with any of the applications on one of computer servers 50-52 and may use any of a variety of storage protocols. The write request typically takes the form: write (offset, size, virtual disk name). The parameter "virtual disk name" is the name of the virtual disk. The parameter "offset" is an offset within the virtual disk (i.e., a value from 0 up to the size of the virtual disk), and the parameter "size" is the length of the data to be written in bytes. As mentioned above, the CVM will trap or capture this write request sent by the application (in the block protocol or NFS protocol, for example).

Next, in step 508 the CVM calculates the MD5 of each block within the data to be written. Blocks may be of any size, although typically the size is 4 k bytes. After all of the message digests have been calculated (or perhaps after each one is calculated), in step 512 the CVM performs a lookup in metadata 410 of the block cache 195 to determine if each MD5 exists within table 440 in order to prevent duplicates from being stored. If an MD5 exists, this indicates that that exact block of data has already been written into the client-side cache 195 (for any virtual disk accessed by that CVM) and that it will not be necessary to write that block of data again into the cache. If the MD5 does not exist, this indicates that the block of data does not exist within the block cache yet and that the data block should be written to the cache. It is possible that within the data requested to be written, that some blocks already exist within the block cache and that some do not. It is also possible that the MD5s for certain blocks will be the same (e.g., if all of these blocks are entirely filled with zeros). For each query of table 440 with an MD5, the result returned is whether or not the MD5 exists, and if it exists, the block cache data offset 448.

For those blocks of data that do not already exist within the block cache, step 516 will write those unique blocks to the data region 420 of the block cache and return the block cache data offset where each block was written in data 420.

Next, for those unique blocks written in step 516 their metadata will be updated in step 520. In step 520 the CVM updates table 440 with the MD5 of each block written to the block cache and its corresponding block cache data offset, so that the block can later be found in the block cache using its MD5.

In step 512 if, for any block of data, its MD5 does already exist in table 440, this indicates that the block of data does exist in the block cache, and control moves to step 524. In step 524, table 480 is updated for every block of data in the write request. This table will be updated to include the virtual disk offset of each block along with its corresponding MD5. Knowing the offset from the write request and the block size, it is a simple matter to calculate the virtual disk offset for each block of the write request. In this fashion, the MD5s for all blocks of the write request will be available in table 480 by using the virtual disk offset for each block as a key, which will be useful when reading data from the storage platform and using this client-side cache. In addition, by performing the check in step 512, duplicate blocks of data are not written to the cache.

Read Using Client-Side Cache

Figure 8:
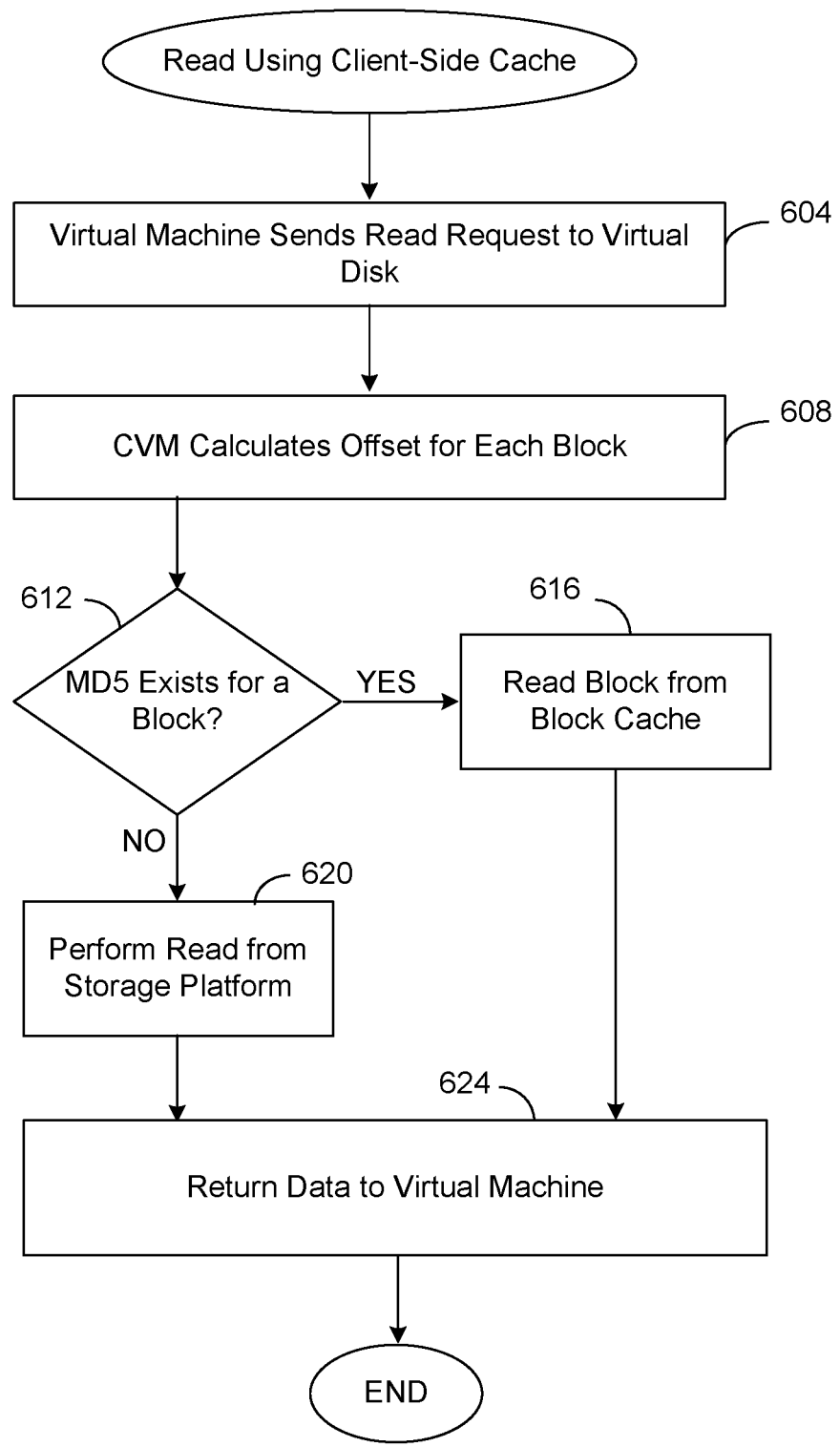
FIG. 8 is a flow diagram describing one embodiment by which a virtual machine reads data from the storage platform.

FIG. 8 is a flow diagram describing one embodiment by which a virtual machine reads data from the storage platform. In this embodiment, an application on a virtual machine is reading from a virtual disk within the platform that has the client-side cache 195 enabled.

In step 604 the virtual machine that desires to read data from the storage platform sends a read request from a particular application to the desired virtual disk. As explained above, the controller virtual machine will then trap or capture the request (depending upon whether it is a block request or an NFS request) and then typically places a request into its own protocol before sending the request to the storage platform.

As mentioned, a read request may originate with any of the virtual machines on computers 50-52 (for example) and may use any of a variety of storage protocols. The read request typically takes the form: read (offset, size, virtual disk name). The parameter "virtual disk name" is the name of a virtual disk on the storage platform. The parameter "offset" is an offset within the virtual disk (i.e., a value from 0 up to the size of the virtual disk), and the parameter "size" is the length of the data to be read in bytes.

The CVM is aware of which virtual disks have the client-side cache enabled, and, if so, before sending the read request to the storage platform, the CVM will first check its block cache 195 to determine whether any of the blocks to be read are already present within this cache. Thus, in step 608, the CVM divides up the read request into blocks; e.g., a request of size 64 k is divided up into sixteen blocks of 4 k each, each block having a corresponding offset within the named virtual disk. Thus, an offset within the named virtual disk is calculated for each block of data.

Step 612 then checks metadata 410 to determine whether an entry exists in table 480 for each of the calculated offsets of the named virtual disk. If an entry exists, this means that the corresponding data block has been stored in the client-side cache and the MD5 488 corresponding to that entry is returned to the CVM. Thus, in step 616 the CVM consults table 440 using the returned MD5 in order to obtain the block cache data offset for that particular block within data 420. Once obtained, the data block is simply read from the block cache at the block cache data offset, thus obviating the need to read a data block from the remote storage platform 20.

If an entry does not exist in table 480 for any of the calculated offsets for the named virtual disk, this means that the corresponding data block has not been previously stored in the client-side cache and that the data block must be read from the remote storage platform. Accordingly, in step 620 a read request for that particular data block is sent to the storage platform which then returns the data block.

It is possible that within a given read request there may be some data blocks that have been stored in the client-side cache and some that have not. Thus, for those data blocks that must be read from the storage platform, the CVM may choose to read those data blocks from the remote storage platform one at a time, or may choose to send a single, combined read request. Those data blocks that do exist within the client-side cache may also be read one by one, or the CVM may issue a single read request for all of those blocks at one time.

In step 624, after collecting both the data blocks read from the storage platform and the data blocks read from the block cache, the CVM then returns this data corresponding to the original read request to the requesting virtual machine using the appropriate protocol, again masquerading either as a block device or as an NFS device depending upon the protocol used by the particular application.

Computer System Embodiment

Figure 9:
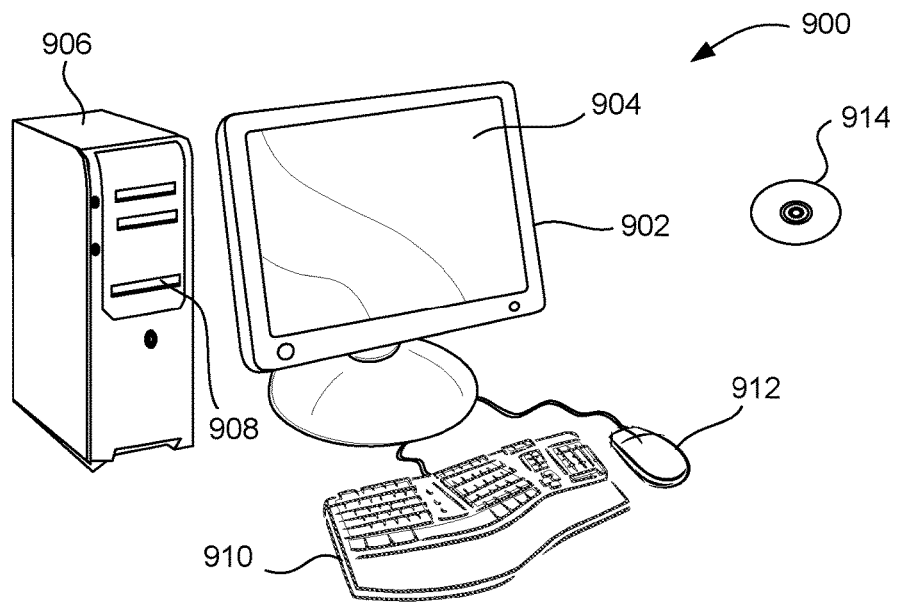
FIGS. 9 and 10 illustrate a computer system suitable for implementing embodiments of the present invention.
Figure 10:
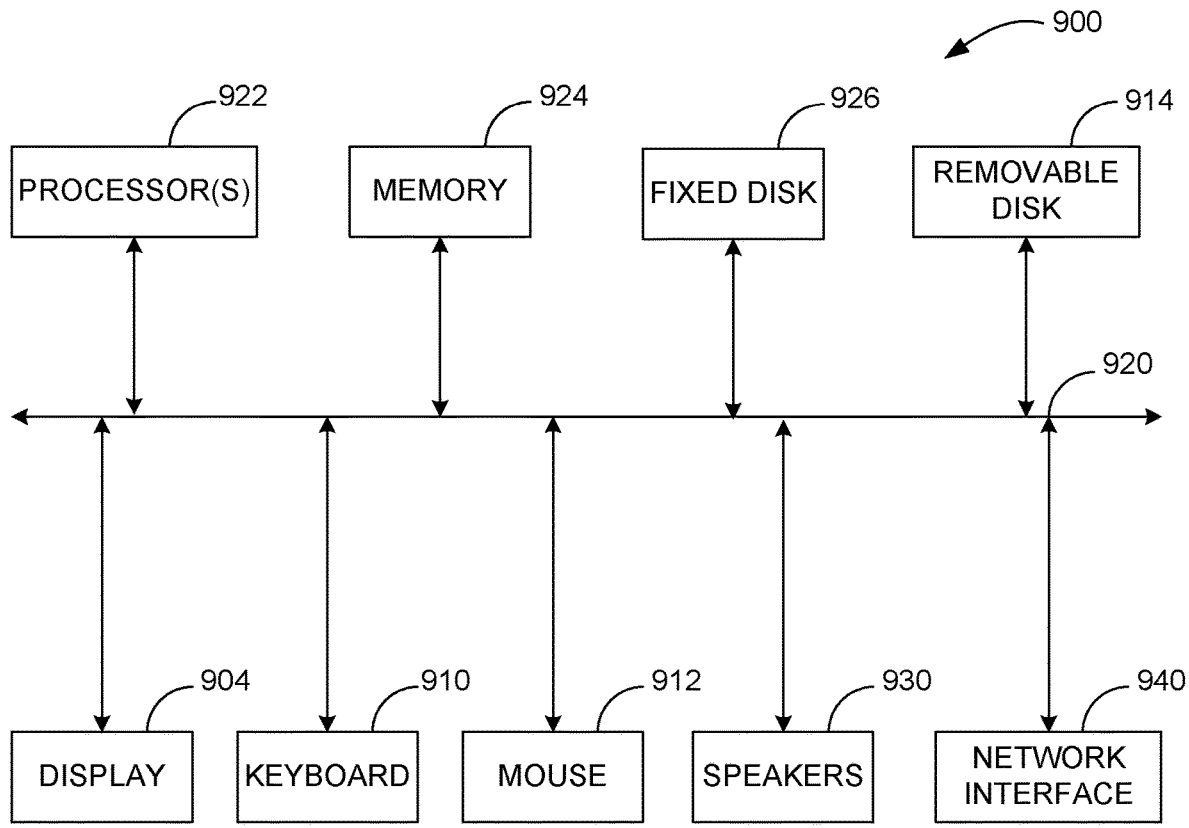

FIGS. 9 and 10 illustrate a computer system 900 suitable for implementing embodiments of the present invention. FIG. 9 shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape;

optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of writing a block of data to a virtual disk on a remote storage platform, said method comprising:
   receiving, at a first computer server of a plurality of computer servers of a compute farm, a write request to write said block of data to said remote storage platform, said write request including an offset within said virtual disk and originating at an other second computer server of said compute farm different from said first computer server,
      wherein said write request originated at a first software application of said compute farm that writes to said remote storage platform, and
      wherein said first computer server receives all write requests to write data to said remote storage platform from all software applications, including the first software application, executing on any computer server in said compute farm that enable client-side caching for a virtual disk in said remote storage platform;
   writing said block of data to a storage node of said remote storage platform;
   calculating a hash value of said block of data using a hash function;
   determining whether said hash value exists in a first metadata table of a block cache of said first computer server, wherein said block cache is a global cache for all said software applications that enable client-side caching in said compute farm;
   when said first computer server determines that said hash value exists in said first metadata table, adding an entry in a second metadata table of said block cache including said virtual disk offset and said hash value as a key/value pair; and
   wherein said calculating, said determining, and said adding are performed only when client-side caching is enabled for said virtual disk.

2. A method as recited in claim 1 wherein said first metadata table includes as a key/value pair comprising said hash value and a block cache data offset that indicates where within said block cache that said block of data exists.

3. A method as recited in claim 1 wherein said block cache is in persistent storage of said first computer server.

4. A method as recited in claim 1 further comprising:
   not writing said block of data into said block cache after said determining.

5. A method as recited in claim 1 wherein said virtual disk offset entry in said second metadata table includes a name of said virtual disk.

6. A method as recited in claim 1 wherein said block cache does not include duplicates of any data block within said block cache.

7. A method as recited in claim 1 wherein said block of data is written to said block cache in conjunction with writing said block of data to said remote storage platform.

8. A method of writing a block of data to a virtual disk on a remote storage platform, said method comprising
   receiving, at a first computer server of a plurality of computer servers of a compute farm, a write request to write said block of data to said remote storage platform, said write request including an offset within said virtual disk and originating at an other second computer server of said compute farm different from said first computer server,
   wherein said write request originated at a first software application of said compute farm that writes to said remote storage platform, and
   wherein said first computer server receives all write requests to write data to said remote storage platform from all software applications, including the first software application, executing on any computer server in said compute farm that enable client-side caching for a virtual disk in said remote storage platform;
   writing said block of data to a storage node of said remote storage platform;
   calculating a hash value of said block of data using a hash function;
   determining whether said hash value exists in a first metadata table of a block cache of said first computer server, wherein said block cache is a global cache for all said software applications that enable client-side caching in said compute farm;
   when said first computer server determines that said hash value does not exist in said first metadata table, writing said block of data into said block cache at a block cache data offset, and storing said hash value and said block cache data offset as a key/value pair in said first metadata table;
   adding an entry in a second metadata table of said block cache including said virtual disk offset and said hash value as a key/value pair; and
   wherein said calculating, said determining, and said adding are performed only when client-side caching is enabled for said virtual disk.

9. A method as recited in claim 8 wherein said block cache is in persistent storage of said first computer server.

10. A method as recited in claim 8 wherein said virtual disk offset entry in said second metadata table includes a name of said virtual disk.

11. A method as recited in claim 8 wherein said block cache does not include duplicates of any data block within said block cache.

12. A method of reading a block of data from a virtual disk on a remote storage platform, said method comprising:
   receiving, at a first computer server of a plurality of computer servers of a compute farm, a read request to read said block of data from said remote storage platform, said read request including an offset within said virtual disk and originating at an other second computer server of said compute farm different from said first computer server,
   wherein said read request originated at a first software application of said compute farm that reads from said remote storage platform, and
   wherein said first computer server receives all read requests to read data from said remote storage platform from all software applications, including the first software application, executing on any computer server in said compute farm that enable client-side caching for a virtual disk in said remote storage platform;

determining whether said virtual disk offset exists as an entry in a first metadata table of a block cache of said first computer server, wherein said block cache is a global cache for all said software applications that enable client-side caching in said compute farm;

when said first computer server determines that said virtual disk offset exists in said first metadata table, retrieving a unique identifier corresponding to said virtual disk offset in said entry;

accessing a second metadata table of said block cache, and retrieving a block cache data offset using said unique identifier as a key;

reading said block of data from said block cache at said block cache data offset; and wherein said determining, said retrieving, said accessing, and said reading are performed only when client-side caching is enabled for said virtual disk.

13. A method as recited in claim 12 wherein said block cache is in persistent storage of said first computer server.

14. A method as recited in claim 12 further comprising:
not reading said block of data from said remote storage platform after said first computer server determines that said virtual disk offset exists in said first metadata table.

15. A method as recited in claim 12 wherein said virtual disk offset entry in said first metadata table includes a name of said virtual disk.

16. A method as recited in claim 12 further comprising:
returning said block of data to said application from said block cache.

17. A method as recited in claim 12 wherein said block cache does not include duplicates of any data block within said block cache.

18. A method as recited in claim 12 wherein said block of data is written to said block cache in conjunction with writing said block of data to said remote storage platform.

19. A method of reading a block of data from a virtual disk on a remote storage platform, said method comprising
receiving, at a virtual machine of a first computer server of a plurality of computer servers of a compute farm, a read request to read said block of data from said remote storage platform, said read request including an offset within said virtual disk and originating at an other second computer server of said compute farm different from said first computer server, wherein said read request originated at a first software application of said compute farm that reads from said remote storage platform, and wherein said first computer server receives all read requests to read data from said remote storage platform from all software applications, including the first software application, executing on any computer server in said compute farm that enable client-side caching for a virtual disk in said remote storage platform;

determining whether said virtual disk offset exists as an entry in a first metadata table of a block cache of said first computer server, wherein said block cache is a global cache for all said software applications that enable client-side caching in said compute farm;

when said first computer server determines that said virtual disk offset does not exist in said first metadata table, reading said block of data from said remote storage platform;

returning said block of data to the first software application executing upon said other second computer server from said virtual disk in said remote storage platform; and wherein said determining is performed only when client-side caching is enabled for said virtual disk.

20. A method as recited in claim 19 wherein said first metadata table includes key/value pairs, wherein said keys are virtual disk offsets, and wherein said values are unique identifiers that each identify a block of data within said block cache.

21. A method as recited in claim 20 wherein each of said keys in said first metadata table includes a virtual disk name.

22. A method as recited in claim 19 wherein said block cache is in persistent storage of said first computer server.

23. A method as recited in claim 19 wherein said block cache does not include duplicates of any data block within said block cache.

* * * * *